(12) United States Patent
Wang et al.

(10) Patent No.: US 7,414,832 B2
(45) Date of Patent: Aug. 19, 2008

(54) DISPLAY DEVICE

(75) Inventors: Te-Hsu Wang, Miao-Li (TW); Ming-Chuan Li, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 78 days.

(21) Appl. No.: 11/440,178

(22) Filed: May 24, 2006

(65) Prior Publication Data

US 2006/0268496 A1 Nov. 30, 2006

(30) Foreign Application Priority Data

May 24, 2005 (CN) .................. 2005 2 0058943

(51) Int. Cl.
*H05K 5/02* (2006.01)
(52) U.S. Cl. .................. 361/681; 361/682; 248/917
(58) Field of Classification Search .......... 361/682, 361/681; 248/917
See application file for complete search history.

(56) References Cited

U.S. PATENT DOCUMENTS

| 5,043,846 | A | * | 8/1991 | Kinoshita | 361/681 |
| 5,103,377 | A | * | 4/1992 | Kobayashi et al. | 361/681 |
| 6,085,388 | A | * | 7/2000 | Kaneko | 16/338 |
| 6,094,340 | A | * | 7/2000 | Min | 361/681 |
| 6,427,288 | B1 | * | 8/2002 | Saito | 16/361 |
| 6,437,975 | B1 | | 8/2002 | Huang | |
| 6,519,812 | B2 | * | 2/2003 | Ko et al. | 16/354 |
| 6,587,166 | B1 | * | 7/2003 | Lee et al. | 349/58 |
| 6,772,983 | B1 | * | 8/2004 | Liao et al. | 248/291.1 |
| 6,859,356 | B2 | * | 2/2005 | Chih et al. | 361/681 |

* cited by examiner

*Primary Examiner*—Jayprakash N Gandhi
*Assistant Examiner*—Ingrid Wright
(74) *Attorney, Agent, or Firm*—Wei Te Chung (57) ABSTRACT

An exemplary display device (2) includes a display module (25), a base (21), and a pivot mechanism (23) for pivoting the display module to the base. The pivot mechanism includes a frame portion (232) fixed to the display module and a pivot axle (231) fixed to the base. The frame portion is pivoted on the pivot axle. Because the frame portion fixed with the display module is pivoted on the pivot axle fixed on the base, the display module can be rotated around the base. Moreover, the pivot mechanism is compactly disposed where the display module connects with the base. Therefore the overall configuration of the display device is compact.

15 Claims, 8 Drawing Sheets

DISPLAY DEVICE

FIELD OF THE INVENTION

The present invention relates to display devices, and particularly to a display device having a display module hingedly attached to a base.

GENERAL BACKGROUND

Display devices have been widely applied to various electronic equipment in which messages or pictures need to be displayed, such as notebook computers and personal computers. Because a typical display device has an optimal viewing angle, it is desirable that the display device can be inclined forward or backward to attain the optimal viewing angle for any particular user.

Figure 9:
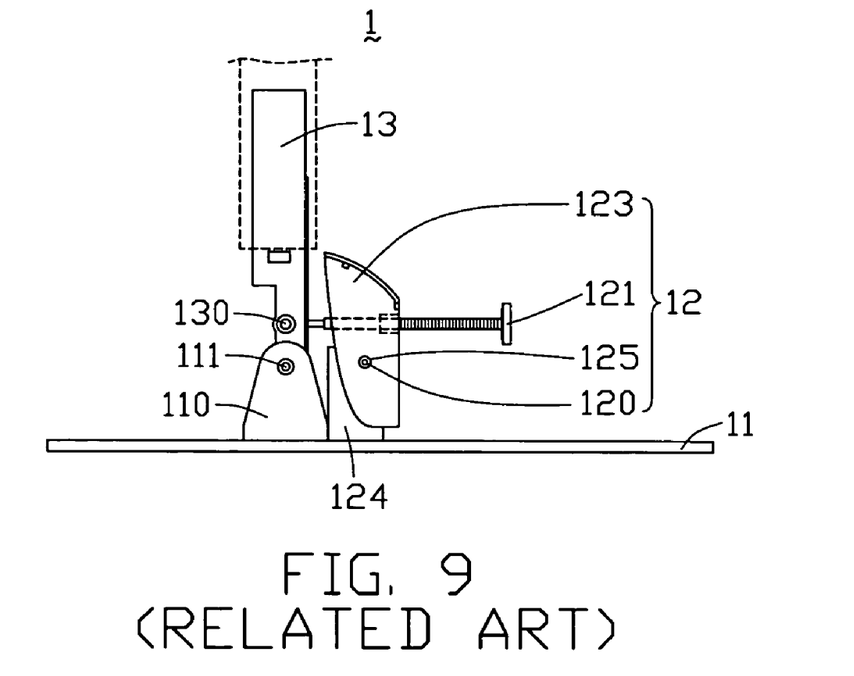
FIG. 9 is a schematic, abbreviated, side view of a conventional display device, the display device including a display module and a base, the display module shown in an upright position.

Referring to FIG. 9, a conventional display device 1 includes a base 11, a pivot mechanism 12, and a display module 13. The base 11 includes a pair of symmetrical first supporting stands 110, each of which has a lock axle 111 for pivoting the display module 13 to the first supporting stands 110. The pivot mechanism 12 includes a first pin 120, a bolt 121, a supporting shelf 123, and a second supporting stand 124. The supporting shelf 123 has a hole 125. The supporting shelf 123 is pivoted on the second supporting stand 124 by means of engagement of the first pin 120 in the hole 125. The display module 13 has a second pin 130. The bolt 121 is pivotably attached with the second pin 130 through the supporting shelf 123.

Figure 10:
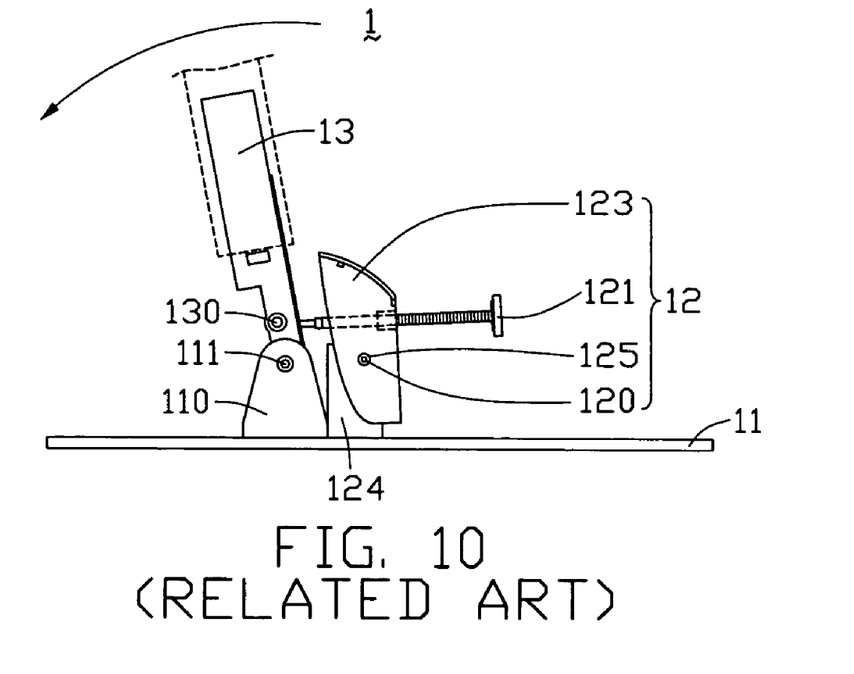
FIG. 10 is similar to FIG. 9, but showing the display module in an inclined position.

Referring also to FIG. 10, when the bolt 121 is rotated by a user, the pivot junction of the bolt 121 and the second pin 130 pushes the second pin 130 forward. Simultaneously, the supporting shelf 123 is slightly rotated about the first pin 120 and thus the second supporting stand 124. Accordingly, the display module 13 is rotated forward about the lock axle 111. When the bolt 121 is rotated and screwed into the supporting shelf 123, the display module 13 is rotated forward. When the bolt 121 is screwed out from the supporting shelf 123, the display module 13 is rotated backward.

However, the display module 13 is rotated about the base 11 by means of manually rotating the bolt 121, which is in an unduly laborious and inconvenient operation. Moreover, because the pivot mechanism 12 is a separate assembly located outside the display device 1, a total volume occupied by the display device 1 is in effect increased.

Therefore, a new display device that can overcome the above-described problems is desired.

SUMMARY

In a preferred embodiment, a display device includes a display module, a base, and a pivot mechanism for pivoting the display module to the base. The pivot mechanism includes a frame portion fixed to the display module and a pivot axle fixed to the base. The frame portion is pivoted on the pivot axle.

Other advantages and novel features will become more apparent from the following detailed description when taken in conjunction with the accompanying drawings.

DETAILED DESCRIPTION OF PREFERRED EMBODIMENTS

Figure 1:
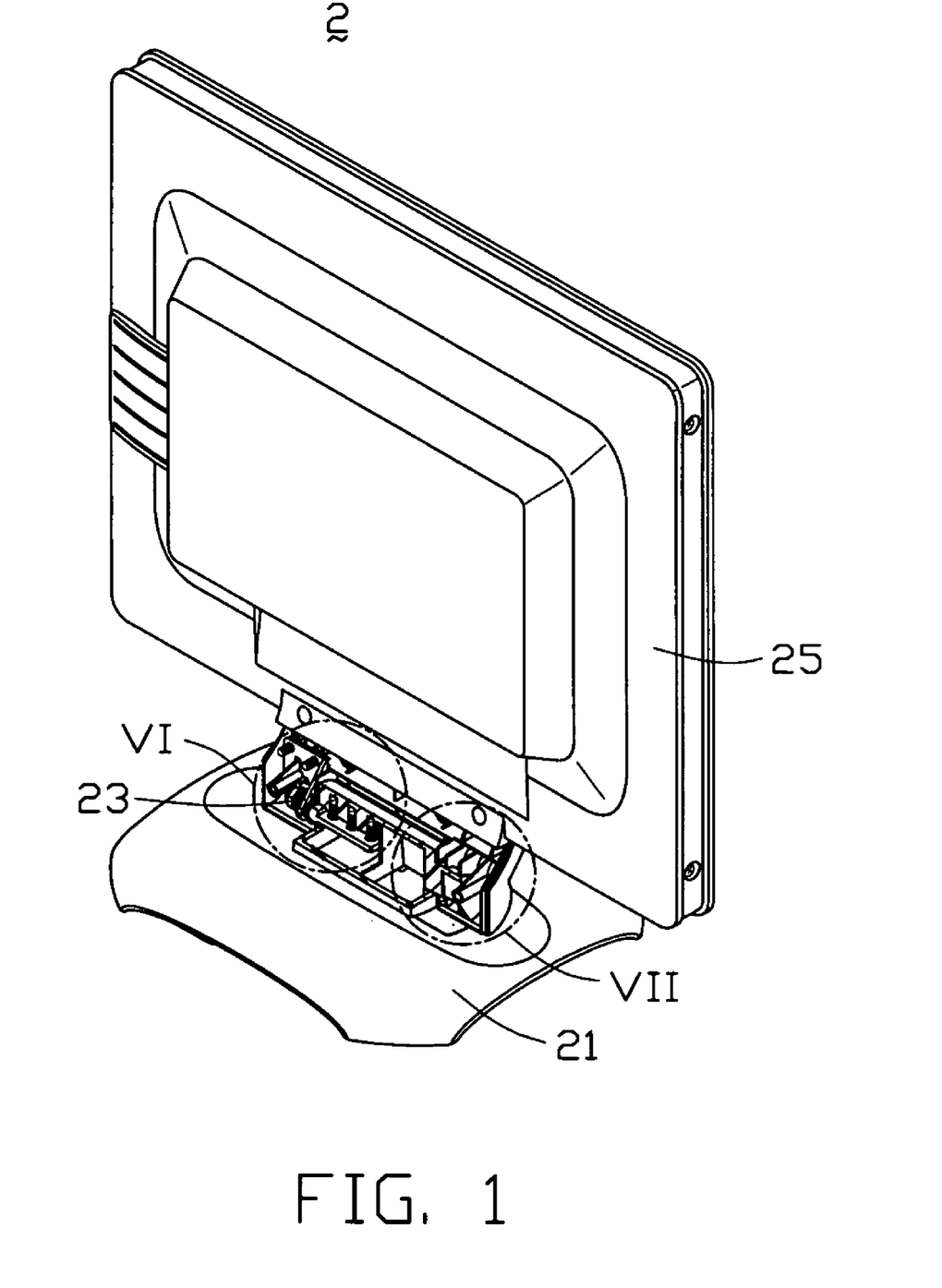
FIG. 1 is an isometric, back, cutaway view of a display device according to an exemplary embodiment of the present invention, the display device including a base and a pivot mechanism.

Referring to FIG. 1, a display device 2 according to a preferred embodiment of the present invention includes a base 21, a pivot mechanism 23, and a display module 25. The display module 25 is pivoted on the base 21 by means of the pivot mechanism 23. The display module 25 can for example be a liquid crystal display (LCD) module, a plasma display module, or a light emitting diode (LED) display module.

Figure 2:
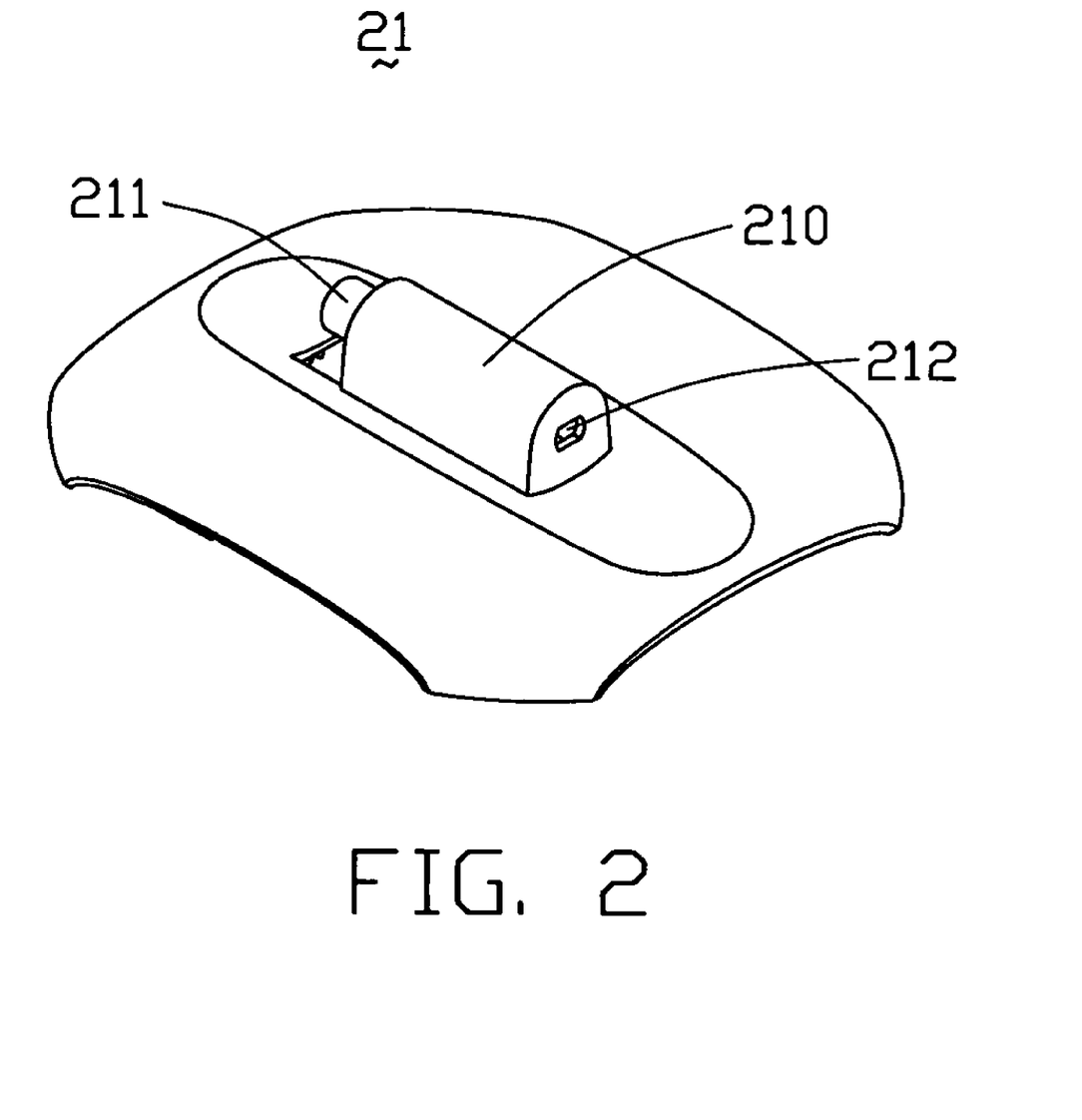
FIG. 2 is an isometric view of the base of the display device of the exemplary embodiment.

Referring to FIG. 2, the base 21 includes an axle housing 210 at a middle thereof. The axle housing 210 has a supporting axle 211 and a blind hole 212 at two opposite ends thereof respectively.

Figure 3:
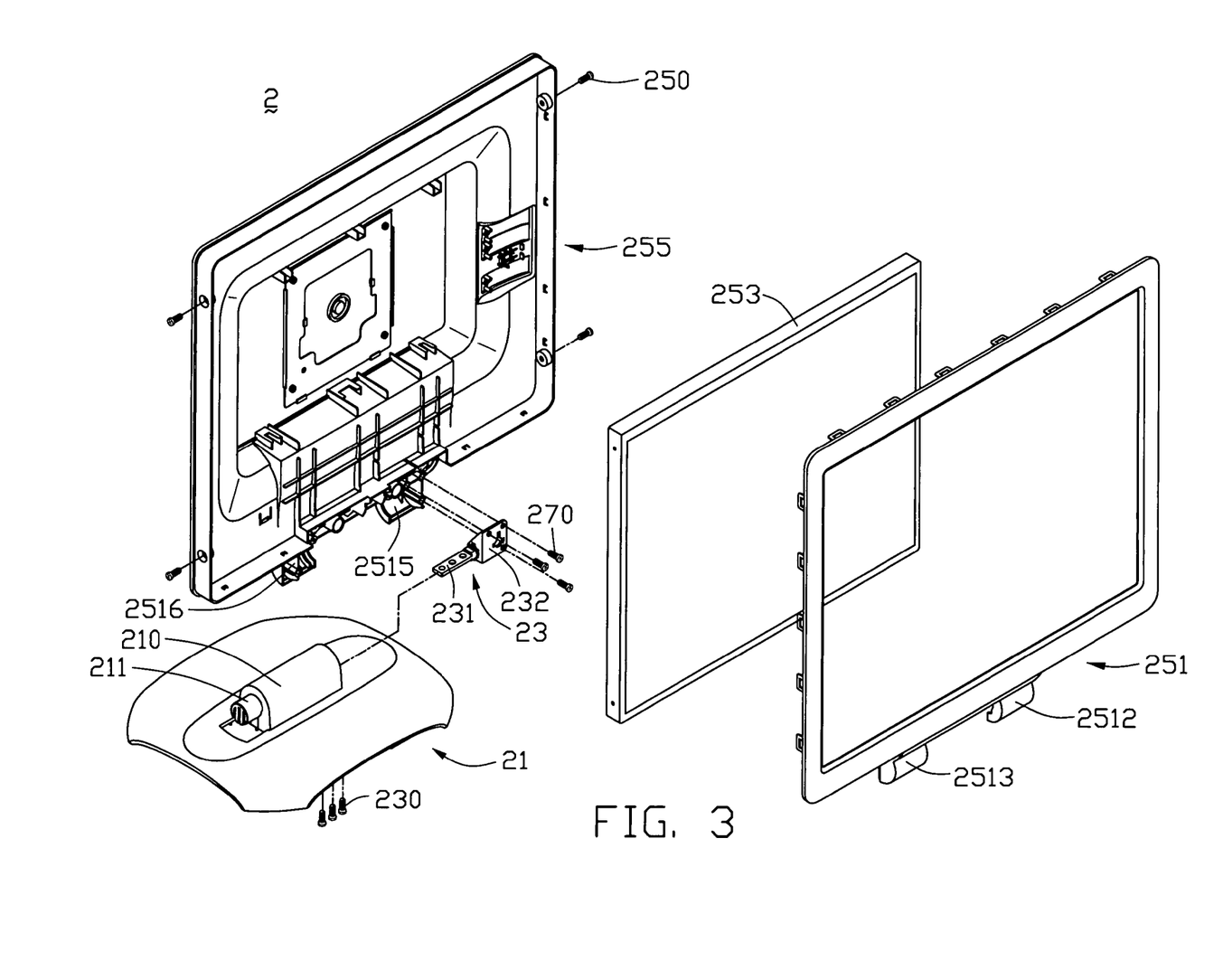
FIG. 3 is an exploded, isometric, front view of the display device of the exemplary embodiment.
Figure 4:
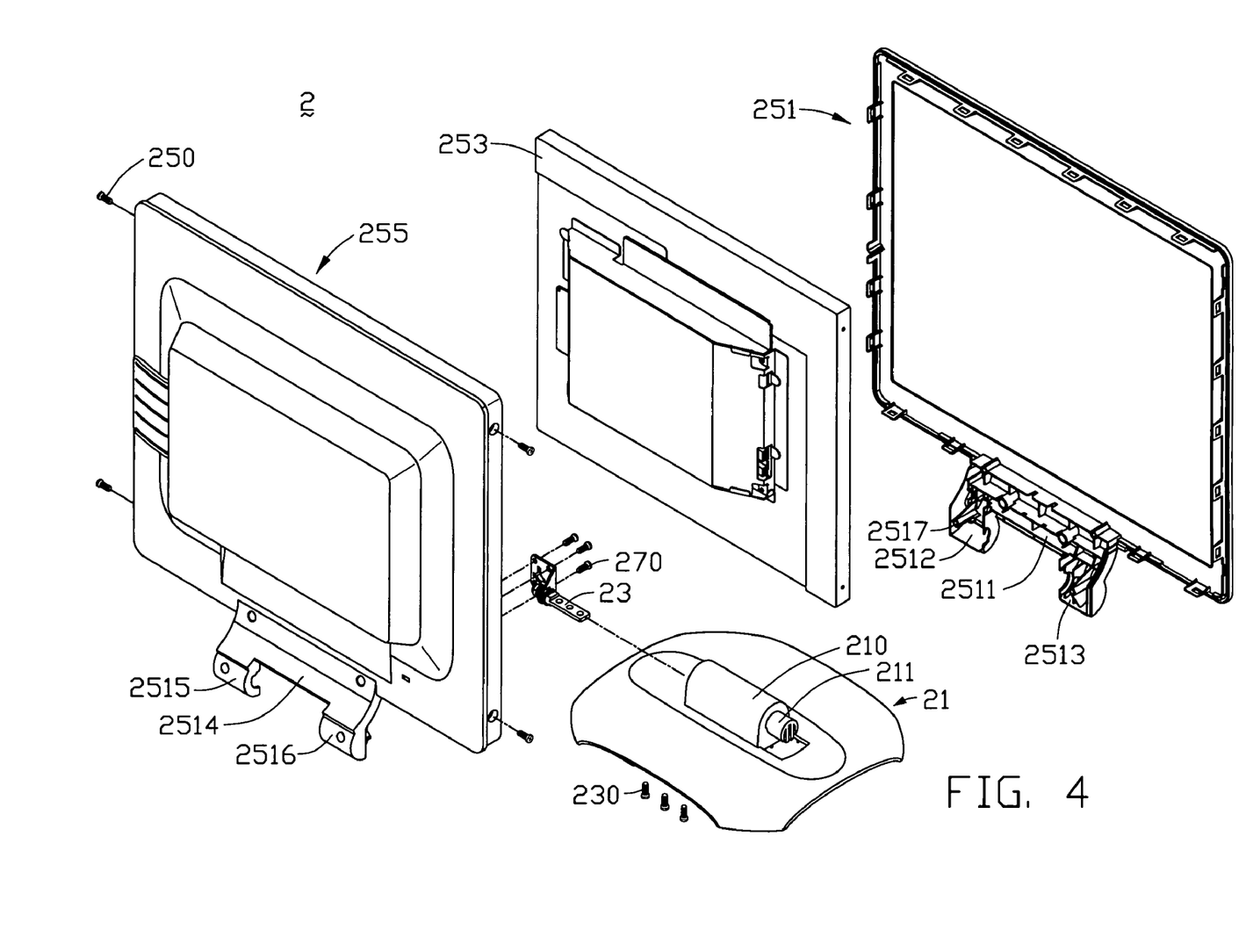
FIG. 4 is an exploded, isometric, back view of the display device of the exemplary embodiment.

Referring to FIGS. 3 and 4, the display module 25 includes a front frame 251, a display panel 253, and a chassis 255. The front frame 251 and the chassis 255 can be fixed together through a plurality of first bolts 250, thus defining a first accommodating space therebetween for accommodating the display panel 253 therein.

The front frame 251 includes a first extension part 2511 extending out from a bottom edge of a main body thereof. The first extension part 2511 includes a hollow first claw 2512 and a hollow second claw 2513 each protruding a predetermined distance from a main body thereof. The chassis 255 includes a second extension part 2514 extending out from a bottom edge of a main body thereof. The second extension part 2514 includes a hollow third claw 2515 and a hollow fourth claw 2516, each protruding the predetermined distance from a main body thereof. The four claws 2512, 2513, 2515 and 2516 are each substantially semicolumnar. When the front frame 251 and the chassis 255 are fixed together, the first claw 2512 and the third claw 2515 can be adhered together, thereby defining a second accommodating space; and the second claw 2513 and the fourth claw 2516 can be adhered together, thereby defining a third accommodating space. The third accommodating space is for accommodating the supporting axle 211 of the axle housing 210. The first claw 2512 has a protrusion 2517 formed therein, for cooperating with the pivot mechanism 23 (see below).

Figure 5:
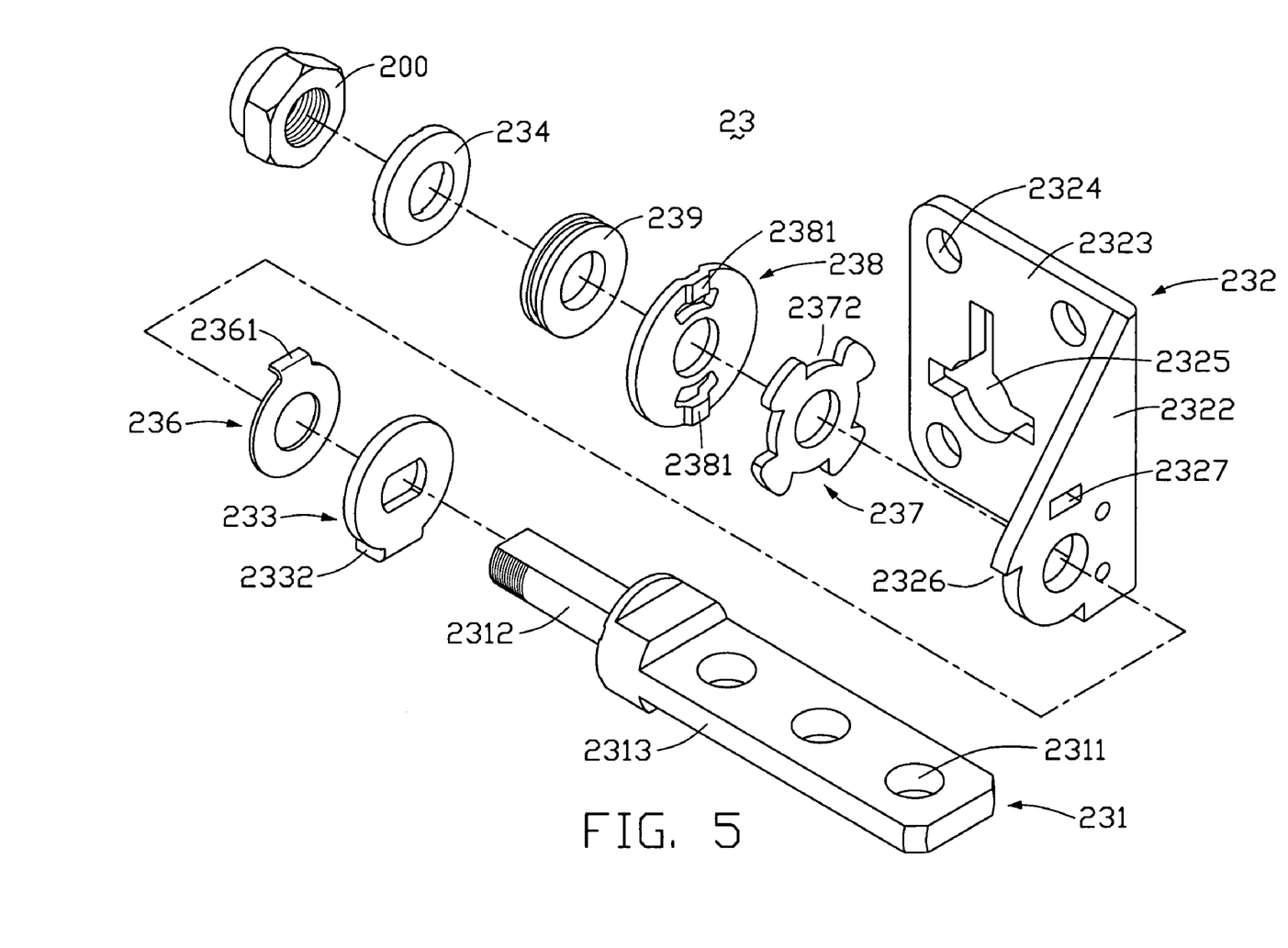
FIG. 5 is an enlarged, exploded, isometric view of the pivot mechanism of the display device of the exemplary embodiment.

Also referring to FIG. 5, the pivot mechanism 23 includes a pivot axle 231, a nut 200, a first washer 234, a leaf spring 239, a first positioning disk 238, a second washer 237, a frame portion 232, a third washer 236, and a second positioning disk 233. The pivot axle 231 includes a bolt portion 2312 and an adjacent fixing portion 2313, which are coaxial with each other. The bolt portion 2312 has the shape of a round column, except that two opposite sides of the bolt portion 2312 are flattened and parallel to each other. That is, a transverse cross-section of the bolt portion 2312 has a keyed shape. The fixing portion 2313 has a plurality of linearly arranged holes 2311. The first washer 234, the leaf spring 239, the first positioning disk 238, the second washer 237, the frame portion 232, the third washer 236, and the second positioning disk 233 each have through holes (not labeled) through which the bolt portion 2312 of the pivot axle 231 is extended, thereby connecting these flat elements together in the stated order. All the through holes are round except for the through hole of the second positioning disk 233, which has a shape corresponding to the keyed shape of the bolt portion 2312 of the pivot axle 231. Therefore when the second positioning disk 233 is engaged around the bolt portion 2312, the second positioning disk 233 cannot rotate relative to the pivot axle 231. The nut 200 cooperates with a threaded end of the bolt portion 2312 of the pivot axle 231 to clamp said flat elements of the pivot mechanism 23, such that desired friction between various of said flat elements is attained. Further, said flat elements can for example be made of iron or copper as required to facilitate the attainment of the desired friction. The first positioning disk 238 has two opposite projections 2381. The second washer 237 has four evenly spaced cutouts 2372 defined in a periphery thereof. Two opposite of the cutouts 2372 respectively receive the projections 2381 such that the projections 2381 are fastened therein.

The frame portion 232 includes a first plate 2322, and a second plate 2323 perpendicularly adjoining the first plate 2322. The through hole of the frame portion 232 is located in the first plate 2322. The first plate 2322 also has a notch 2327 adjacent to the through hole. An arc-shaped limiting cutout 2326 is defined in an edge portion of the first plate 2322 near the through hole. A center point of an imaginary circle on which the limiting cutout 2326 lies is the same as a center point of the through hole. The third washer 236 includes a folded extension 2361, which is received in the notch 2327 such that the third washer 236 is fastened to the frame portion 232. The second positioning disk 233 includes a limiting extension 2332, which is movably received in the limiting cutout 2326 of the first plate 2322 of the frame portion 232. Thereby, portions of the first plate 2322 at opposite ends of the limiting cutout 2326 limit the range of movement of the limiting extension 2332 in the limiting cutout 2326, and so the pivot axle 231 can rotate relative to the frame portion 232 only within a predetermined range of angles. The second plate 2323 is substantially rectangular. The second plate 2323 includes four lock holes 2324 located at four corners thereof respectively, and a generally T-shaped cutout 2325 at a center thereof for receiving the protrusion 2517 of the first extension part 2511 of the front frame 251.

Figure 6:
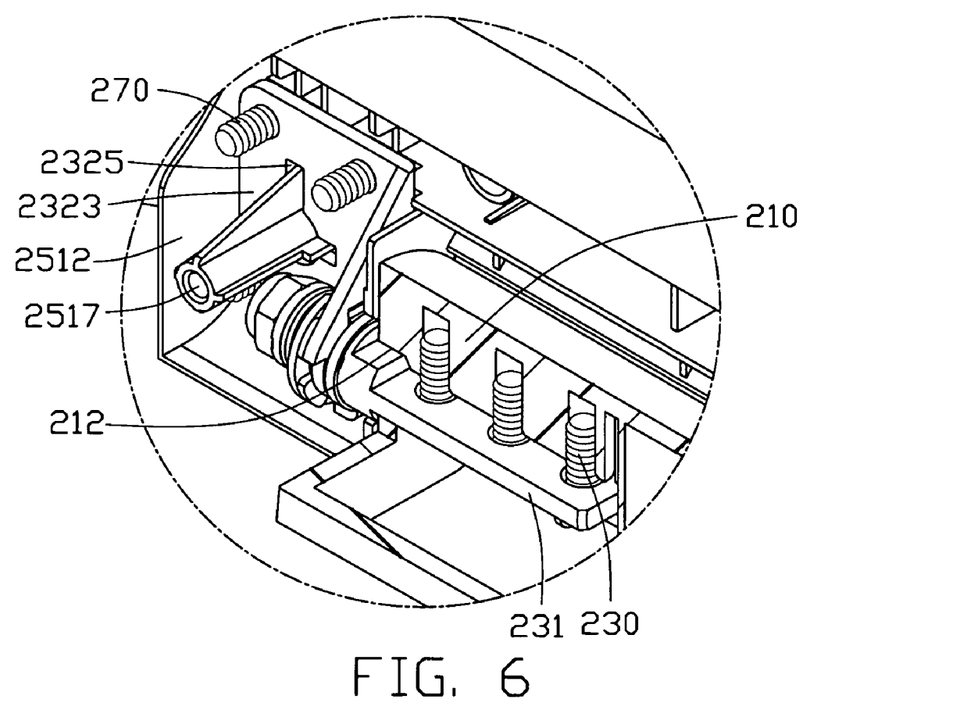
FIG. 6 is an enlarged view of a circled portion VI of FIG. 1.
Figure 7:
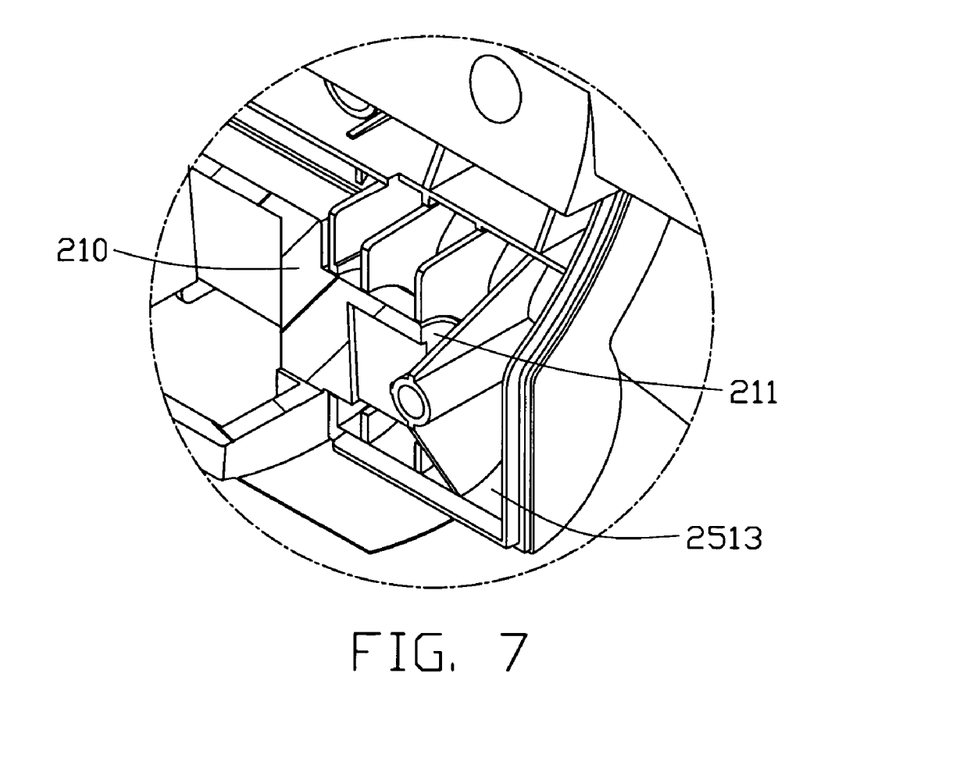
FIG. 7 is an enlarged view of a circled portion VII of FIG. 1.
Figure 8:
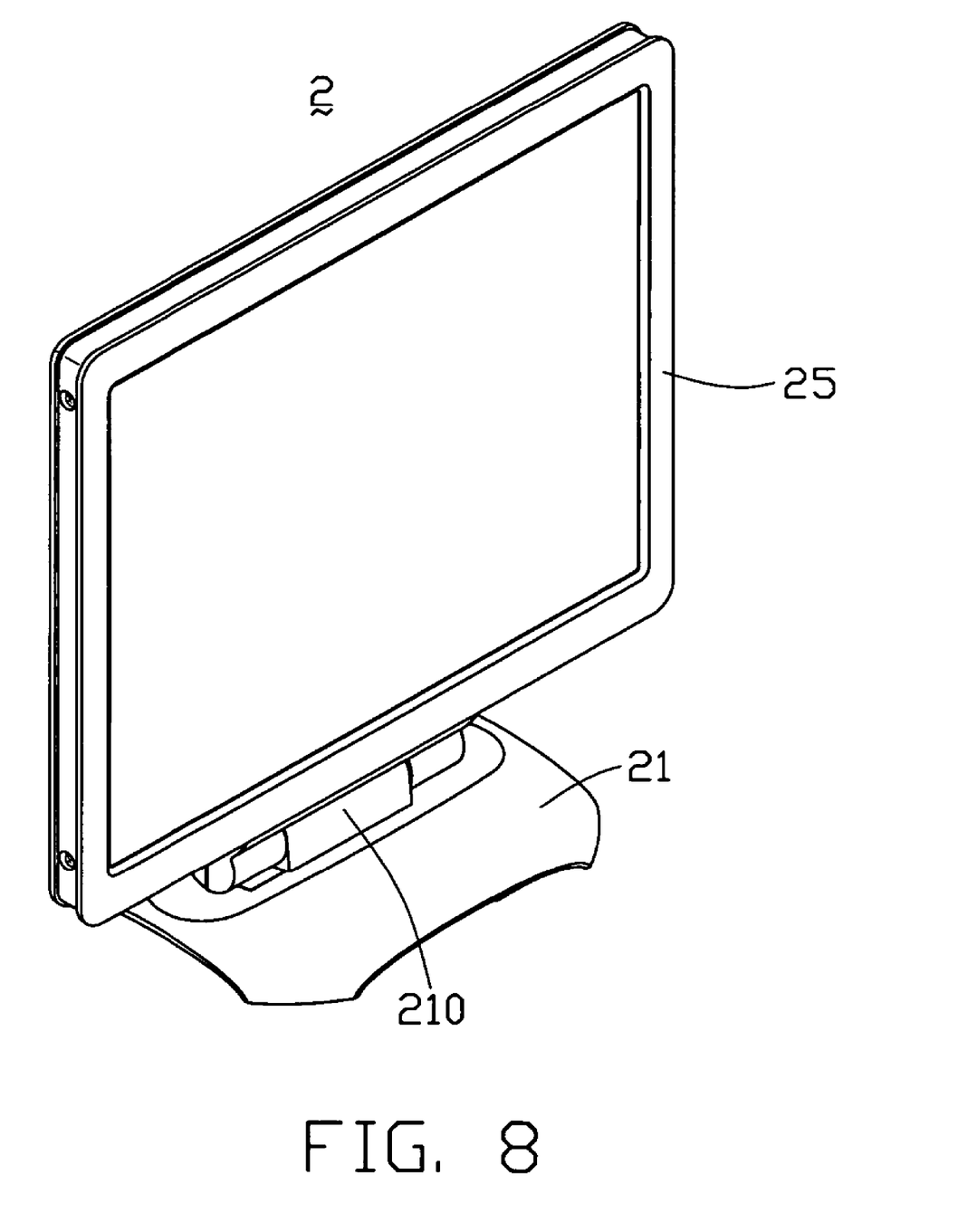
FIG. 8 is an isometric, front view of the display device of the exemplary embodiment.

Also referring to FIGS. 6, 7, and 8, assembly of the display device 2 is as follows. First, the pivot mechanism 23 is assembled together (see above). Second, the fixing portion 2313 of the pivot axle 231 of the pivot mechanism 23 is inserted into the blind hole 212 of the axle housing 210. The fixing portion 2313 is fixed in the axle housing 210 by means of engagement of the third bolts 230 in the holes 2311 of the fixing portion 2313. Thus, assembly of the pivot mechanism 23 with the base 21 is completed. Third, the frame portion 232 of the pivot mechanism 23 is fixed to the first claw 2512 of the first extension part 2511 of the front frame 251, by means of engagement of the four second bolts 270 in the lock holes 2324 and engagement of the protrusion 2517 in the T-shaped cutout 2325. Fourth and finally, the front frame 251 and the chassis 255 are fixed together using the first bolts 250, with the display panel 253 being accommodated in the first accommodating space and sandwiched between the front frame 251 and the chassis 255. In particular, the first claw 2512 and the third claw 2515 are adhered together, with the frame portion 232 being accommodated in the second accommodating space therebetween; and the second claw 2513 and the fourth claw 2516 are adhered together, with the supporting axle 211 being accommodated in the third accommodating space therebetween. Thus, assembly of the display module 25 with the base 21 via the pivot mechanism 23 is completed.

The frame portion 232 fixed to the display module 25 can be rotated about the pivot axle 231 fixed to the base 21, and thus the display module 25 can be rotated around the base 21. Friction between a variety of said flat elements of the pivot mechanism 23 is such that a user can manually rotate the display module 25 to a desired angle, and when the desired angle is reached the display module 25 simply stays secured in the desired position and does not move. Thereby, the rotating operation is simple. By configuring a length of the limiting cutout 2326, a total range of rotation of the display module 25 is controlled accordingly. Moreover, the pivot mechanism 23 is compactly disposed where the display module 25 connects with the base 21. Therefore the overall configuration of the display device 2 is compact.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A display device comprising:
   a display module;
   a base; and
   a pivot mechanism for pivoting the display module to the base, the pivot mechanism comprising one frame portion fixed to the display module, a pivot axle fixed to the base, and a positioning disk engaged around the pivot axle;
   wherein the frame portion is pivoted on a single side of the pivot axle in order to pivot the display module to the base through a single pivot engagement, the positioning disk comprises a limiting extension, and the frame portion comprises a limiting cutout movably receiving the limiting extension.

2. The display device as claimed in claim 1, wherein the base comprises a hole for accommodating the other side of the pivot axle.

3. The display device as claimed in claim 1, wherein the display module is a liquid crystal display (LCD) module.

4. The display device as claimed in claim 1, wherein the display, module is a plasma display module.

5. The display device as claimed in claim 1, wherein the display module is a light emitting diode (LED) display module.

6. The display device as claimed in claim 1, wherein the pivot mechanism further comprises a washer engaged around the pivot axle.

7. The display device as claimed in claim 1, wherein portions of the frame portion at opposite ends of the limiting cutout limit a range of movement of the limiting extension in the limiting cutout, whereby the pivot axle can rotate relative to the frame portion only within a predetermined range of angles.

8. The display device as claimed in claim 1, wherein the display module comprises a front frame, a display panel, and a chassis, and when the front frame and the chassis are attached together, the front frame and the chassis cooperatively define a first accommodating space accommodating the display panel therein.

9. The display device as claimed in claim 8, wherein the front frame comprises a first extension part, the first extension part comprising a hollow first claw protruding out therefrom, and the chassis comprises a second extension part, the second extension part comprising a hollow third claw protruding out therefrom.

10. The display device as claimed in claim 9, wherein the first and third claws are each substantially semicolumnar.

11. The display device as claimed in claim 10, wherein when the first and third claws are attached together, the first and second claws cooperatively define a second accommodating space accommodating the frame portion therein.

12. The display device as claimed in claim 11, wherein the first extension part further comprises a hollow, substantially semicolumnar second claw, and the second extension part further comprises a hollow, substantially semicolumnar fourth claw.

13. The display device as claimed in claim 12, wherein when the second and fourth claws are attached together, the second and fourth claws cooperatively define a third accommodating space.

14. The display device as claimed in claim 13, wherein the base comprises a supporting axle accommodated in the third accommodating space.

15. The display device as claimed in claim 11, wherein the first claw comprises a protrusion therein, and the frame portion further comprises a cutout engagingly receiving the protrusion.

* * * * *